United States Patent
Aizawa et al.

(10) Patent No.: US 12,446,164 B2
(45) Date of Patent: Oct. 14, 2025

(54) DISPLAY DEVICE

(71) Applicant: FANUC CORPORATION, Yamanashi (JP)

(72) Inventors: Tomoyuki Aizawa, Yamanashi (JP); Junichi Tezuka, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 229 days.

(21) Appl. No.: 18/249,722

(22) PCT Filed: Nov. 18, 2021

(86) PCT No.: PCT/JP2021/042402
§ 371 (c)(1),
(2) Date: Apr. 19, 2023

(87) PCT Pub. No.: WO2022/113871
PCT Pub. Date: Jun. 2, 2022

(65) Prior Publication Data
US 2023/0413456 A1    Dec. 21, 2023

(30) Foreign Application Priority Data
Nov. 25, 2020   (JP) ................... 2020-195294

(51) Int. Cl.
*H05K 5/00*     (2025.01)
*G06F 3/0484*   (2022.01)

(52) U.S. Cl.
CPC ......... *H05K 5/0018* (2022.08); *G06F 3/0484* (2013.01)

(58) Field of Classification Search
CPC ............................ H05K 5/0018; G06F 3/0484
See application file for complete search history.

(56) References Cited

U.S. PATENT DOCUMENTS 8,190,287 B2 * 5/2012 Iwashita ............ G05B 19/4097
                                                        700/192
12,045,034 B2 * 7/2024 Shigemori ............ G05B 19/05
                    (Continued)

FOREIGN PATENT DOCUMENTS

JP    2004-021954 A    1/2004
JP    2005-202792 A    7/2005
                    (Continued)

OTHER PUBLICATIONS

International Search Report issued in PCT/JP2021/042402; mailed Jan. 25, 2022.

*Primary Examiner* — Zoheb S Imtiaz

(74) *Attorney, Agent, or Firm* — Studebaker Brackett PLLC

(57) ABSTRACT

The present invention addresses the problem of providing a display device with which it is possible to display a location in a machining path at which a step occurs that is large enough to affect machining precision without actual machining, and to be able to accurately and at low cost predict the occurrence of the step in the machining path. The problem can be resolved with a display device with which: time-series data is acquired for the position of a driven body or an electric motor on each axis of a machine tool; machining paths are calculated based on the acquired time-series data for the position of the driven body or electric motor on each axis; based on the calculation result for the machining paths, a height reference plane is set for each machining path; the heights from the reference planes of adjacent machining paths are compared; and the locations on the machining paths in which height differences occur that are greater than or equal to a set threshold value are displayed.

5 Claims, 11 Drawing Sheets

(56) References Cited

U.S. PATENT DOCUMENTS

| | | | | |
|---|---|---|---|---|
| 2011/0015877 A1* | 1/2011 | Okita | ................... | G05B 19/409 |
| | | | | 702/41 |
| 2013/0169208 A1* | 7/2013 | Tezuka | ................... | G05B 19/19 |
| | | | | 318/570 |

FOREIGN PATENT DOCUMENTS

| | | |
|---|---|---|
| JP | 2014-078102 A | 5/2014 |
| JP | 2018-126849 A | 8/2018 |
| JP | 2020-098523 A | 6/2020 |
| JP | 2020-181398 A | 11/2020 |

* cited by examiner

1 : DETECT REVERSAL LOCATION 4
   (LOCATION SURROUNDED BY ELLIPSE)

2 : SELECT MEASUREMENT POINTS (ROUND POINTS ON MACHINING PATH 40) BEFORE AND AFTER REVERSAL AND DERIVE FORMULA FOR AVERAGE PLANE (= REFERENCE PLANE 60)

3 : DEFINE DIRECTION (= HEIGHT DIRECTION, ARROW)
    PERPENDICULAR TO REFERENCE PLANE 60

4 : SPECIFY ADJACENT PATHS (INDICATED BY ARROWS BETWEEN MACHINING PATHS 40)

5 : CALCULATE HEIGHT OF EACH MEASUREMENT POINT RELATIVE
TO AVERAGE PLANE (= REFERENCE PLANE 60) AND COMPARE
IT WITH HEIGHT OF ADJACENT PATH
(DETERMINE THAT THERE IS STEP WHEN THERE IS DIFFERENCE
OF CERTAIN THRESHOLD VALUE OR MORE)

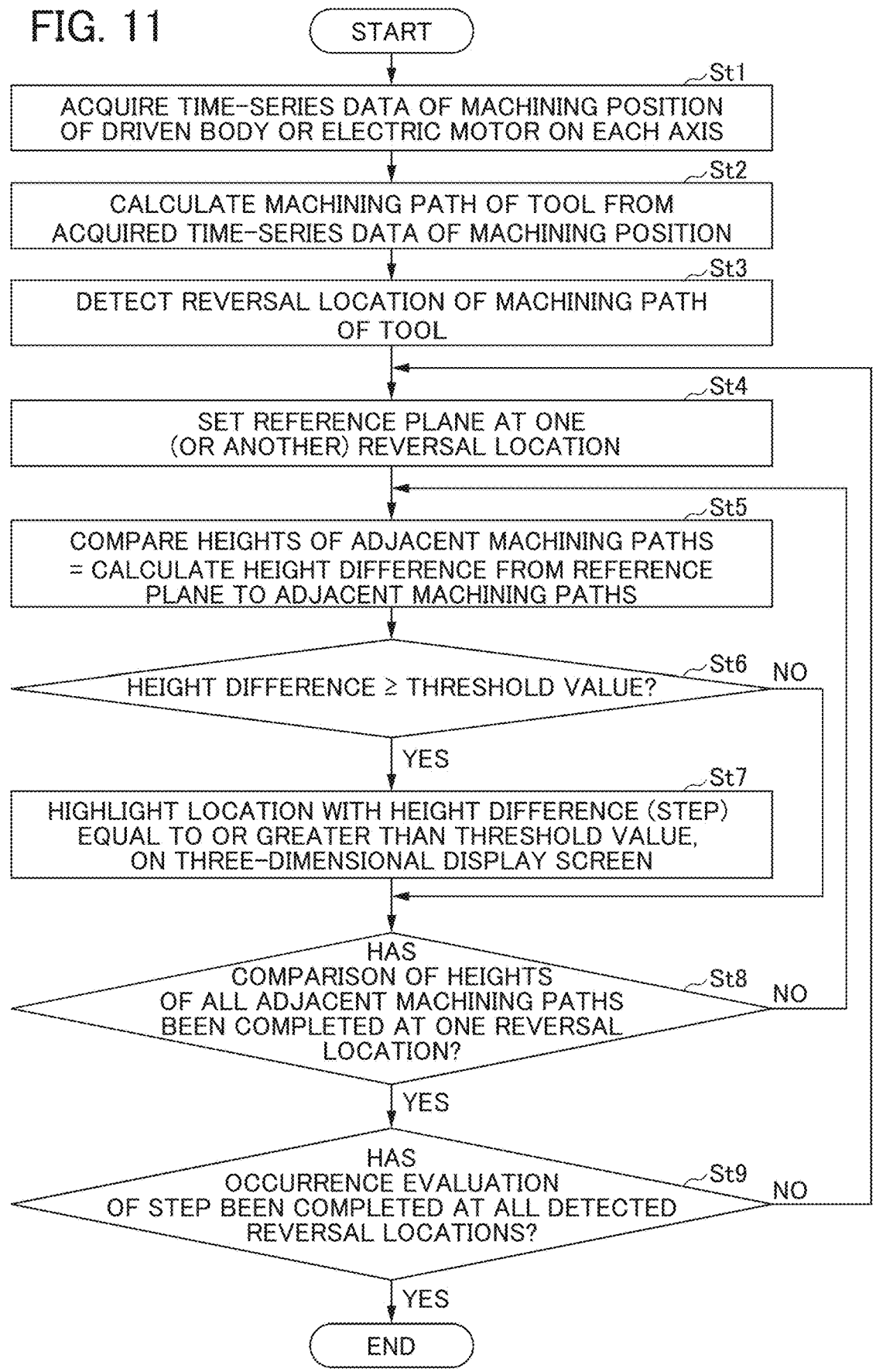

DISPLAY DEVICE

TECHNICAL FIELD

The present invention relates to a display device that displays a machining path due to a drive axis driven and controlled by a servo control device in a machine tool or an industrial machine, and more particularly to a display device that displays a location where a step occurs in the machining path.

BACKGROUND ART

In machining by a machine tool or an industrial machine, machining defects occur due to various causes. As one of the causes, it is known that machining defects occur due to problems arising from the machining path. For example, when a step occurs in the machining path, the surface quality of a workpiece deteriorates, the machining accuracy decreases, and thus the workpiece becomes defective.

Therefore, conventionally, display devices have been devised that are capable of displaying various characteristics of a tool path in order to grasp problematic issues of the machining path to cope with problems related to the machining path or to find a decrease in machining accuracy from the machining path.

In Patent Document 1, since a machine tool for performing machining by an interpolating operation of a servo axis has a tendency that a shape error between a movement command shape of a tool and an actual movement path shape (machining shape) may increase at a reversal location where a moving direction (polarity) of the servo axis is reversed, a display device is disclosed that displays a reversal location of a servo axis on a tool path so as to be capable of grasping a velocity of the servo axis.

In Patent Document 2, based on the fact that when machining traces are generated on a workpiece in NC control machining, it is necessary to quickly and accurately investigate the cause of the traces, a method of presenting a display device capable of appropriately displaying NC data corresponding to the pursuit of the causes is disclosed. Specifically, inclinations of minute line segments obtained by dividing a machining path in one axis selected from three XYZ axes on spatial coordinates on which the machining path occurs, for example, the Z-axis are determined as positive/negative/zero, different display characteristics, for example, display colors are given according to each inclination, and thus unevenness of a tool path can be known from the change situation.

In Patent Document 3, an image display device is disclosed that visualizes a reversal location of a tool and displays it by superimposing on an image of an object to be machined so as to determine, when a machining problem such as streaks occurring on a machining surface of an object to be machined during machining with a machine tool is generated, whether the cause of the machining problem is a reversal of the moving direction of the tool.

Patent Document 1: Japanese Unexamined Patent Application, Publication No. 2014-78102
Patent Document 2: Japanese Unexamined Patent Application, Publication No. 2004-21954
Patent Document 3: Japanese Unexamined Patent Application, Publication No. 2020-98523

DISCLOSURE OF THE INVENTION

Problems to be Solved by the Invention

As described above, from the knowledge that one of reasons for the decrease in machining accuracy of machining by a machine tool is a problem in the machining path and the cause of the decrease in machining accuracy is investigated from the machining path, display devices have been developed to display certain situations of the machining path. However, even when these display devices are used, it is difficult to foresee that a step occurs in the machining path without actual machining, that is, before actual machining.

In Patent Document 1, the reversal location of the tool can be displayed on the path of the tool, but since it is not possible to know that steps do not necessarily occur in the machining path at all the reversal locations of the tool and to know the degree of the step in the machining path, it is not possible to accurately foresee the occurrence of steps in the machining path that adversely affect machining accuracy.

In Patent Document 2, the occurrence of machining traces is recognized from the display device during actual machining, that is, after actual machining, but steps in the machining path is not foreseen before actual machining. In order to accurately find machining traces, which are minute irregularities, without overlooking, it is necessary to divide the machining path into many minute line segments and to perform calculations, and it is assumed that the volume and cost of such calculations are enormous.

The display device disclosed in Patent Document 3 superimposes the reversal location of the movement path of the tool on the image of the surface to be machined after actual machining, thereby detecting whether streaks occurring on the surface to be machined after actual machining are caused by the reversal of the movement path of the tool, but does not foresee steps in the machining path.

In an evaluation of steps in the machining path under the current circumstances, it is necessary to judge the actually machined workpiece with eyes of a person in charge of a manufacturing process, and thus there have been problems that credibility due to variations in evaluations for each person in charge is lack, the yield of workpieces decreases, and costs increase. In particular, there have been problems of accuracy of evaluation and reduction in cost at the time of start-up of the machine.

The present disclose provides a display device capable of displaying an occurrence location in a machining path of a large step that affects machining accuracy without actual machining, and capable of accurately foreseeing the occurrence of the step in the machining path at low costs.

Means for Solving the Problems

In order to solve the above problems, the present disclosure provides a display device of a machining path for a servo control device configured to control an electric motor that drives axes of a machine tool or an industrial machine, the display device including: a data acquisition unit that acquires time-series data of a position of a driven body or an electric motor on each axis of the machine tool or the industrial machine; a path calculation unit that calculates a machining path from the time-series data of the position of the driven body or the electric motor on each axis which is acquired by the data acquisition unit; a path comparison unit that, from a result calculated by the path calculation unit, sets a reference plane for a height of the machining path and compares heights of adjacent machining paths from the reference plane; and a display unit that displays a location where a height difference equal to or greater than a set threshold value occurs on the adjacent machining paths.

Effects of the Invention

According to the display device of the present disclosure, there is provided the display device capable of displaying an occurrence location in a machining path of a large step that affects machining accuracy without actual machining, and thus the occurrence of the step in the machining path can be accurately foreseen at low costs. In addition, quantitative evaluation becomes possible, and in particular, improvement in efficiency of an evaluation process at the time of start-up of the machine is expected.

BRIEF DESCRIPTION OF THE DRAWINGS

FIG. 11 is a flowchart showing a display method of the present disclosure.

PREFERRED MODE FOR CARRYING OUT THE INVENTION

An embodiment of the present disclosure will be described below in detail with reference to the drawings.

Figure 1:
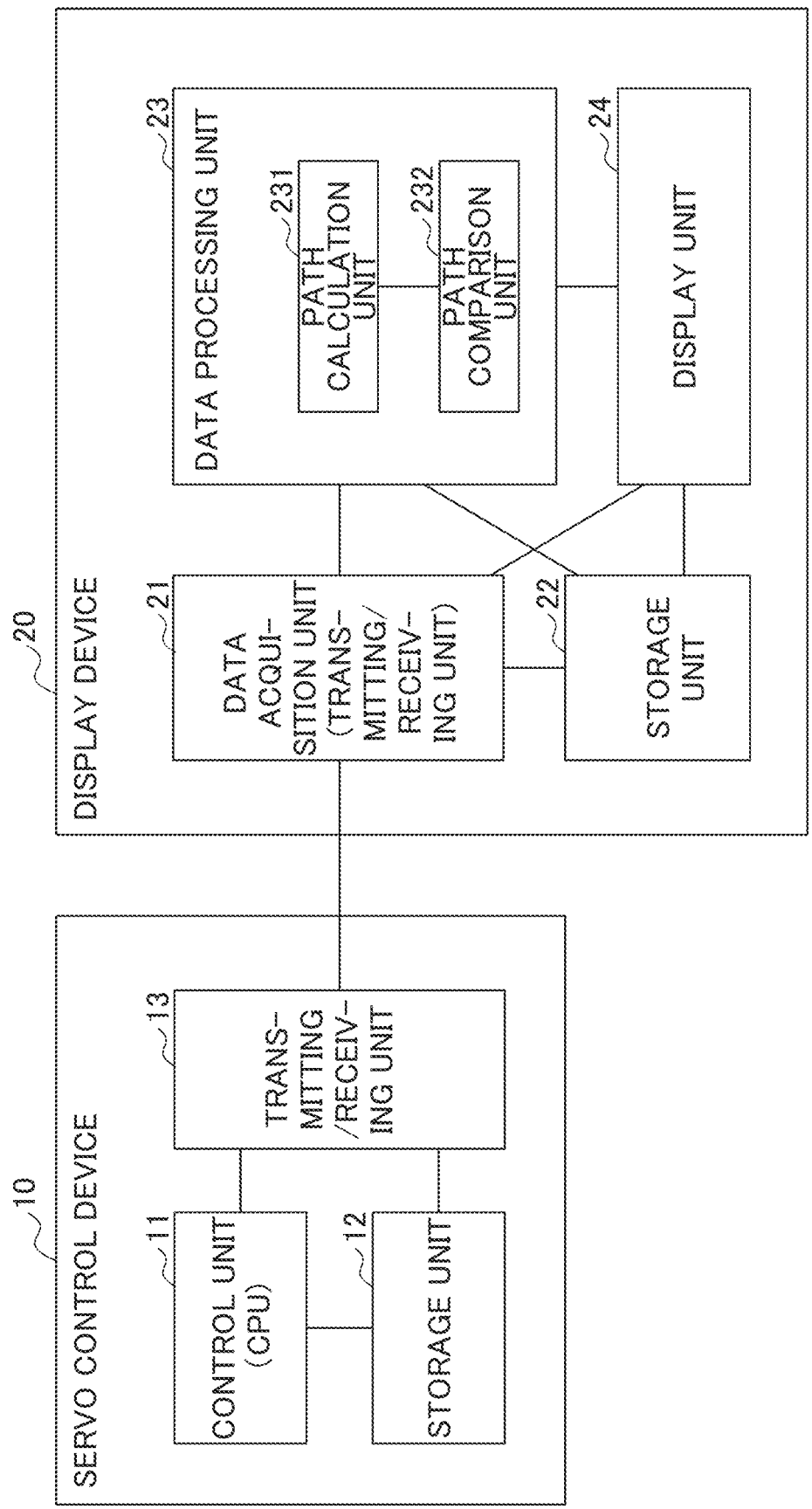
FIG. 1 is a block diagram showing components of a display device according to the present disclosure.

FIG. 1 is a block diagram showing components of a display device according to an embodiment of the present disclosure. As shown in FIG. 1, a display device 20 of the present disclosure acquires (receives) data from a servo control device 10 that controls driving of machine tools and industrial machines, performs data processing necessary for display, and displays a result of the data processing.

The servo control device 10 includes, as components, a control unit (CPU) 11 such as a microcomputer, a storage unit 12 including memory members, for example, ROM and RAM, and a transmitting/receiving unit 13 that transmits and receives signals to/from the display device 20 and sends data necessary for display on the display device 20. Signals (data) are delivered between the control unit (CPU) 11, the storage unit 12, and the transmitting/receiving unit 13, respectively.

The display device 20 includes a data acquisition unit 21 that is a transmitting/receiving unit configured to transmit and receive signals to and from the servo control device 10 and acquires data necessary for display from the servo control device, a storage unit 22 including memory members, for example, ROM and RAM, a data processing unit 23 such as a microcomputer that performs data processing necessary for display, and a display unit 24 that displays a result processed by the data processing unit 23. Signals (data) are delivered between the data acquisition unit 21, the storage unit 22, the data processing unit 23, and the display unit 24, respectively.

The data processing unit 23 includes a path calculation unit 231 and a path comparison unit 232. The data acquired by the data acquisition unit 21 of the display device 20 is sent to the data processing unit 23, a machining path is calculated by the path calculation unit 231 in the data processing unit 23 as will be described below, heights of machining paths adjacent to each other are compared with each other by the path comparison unit 232 to determine the presence or absence of a step, and the result thereof is sent to and displayed on the display unit 24.

Next, a step between the machining paths will be described. There are mainly two factors that cause the step between the machining paths. A first factor is a reversal of a machining tool that causes the step, and a second factor is that a command path created from a machining program has a step. In a second factor, which is caused by a machining program, a step is provided out of necessity in some cases, and even when this causes a decrease in machining accuracy, there is no choice but to cope with it individually.

A description will be additionally made with respect to the reversal of the machining tool which is the first factor of the causes of the step. In machining with a machine tool, when the machining tool maintains a constant inclination on a machining surface and advances at a constant speed, no step occurs between machining paths. At the reversal location of the machining tool, the inclination of the tool with respect to the machining surface and the advancing velocity of the tool change suddenly, and it is considered that the delay in servo response to such a sudden change causes overshoots and undershoots depending on an acceleration/deceleration time constant and setting of feed forward and velocity feed forward, and causes steps in the machining path.

Figure 2:
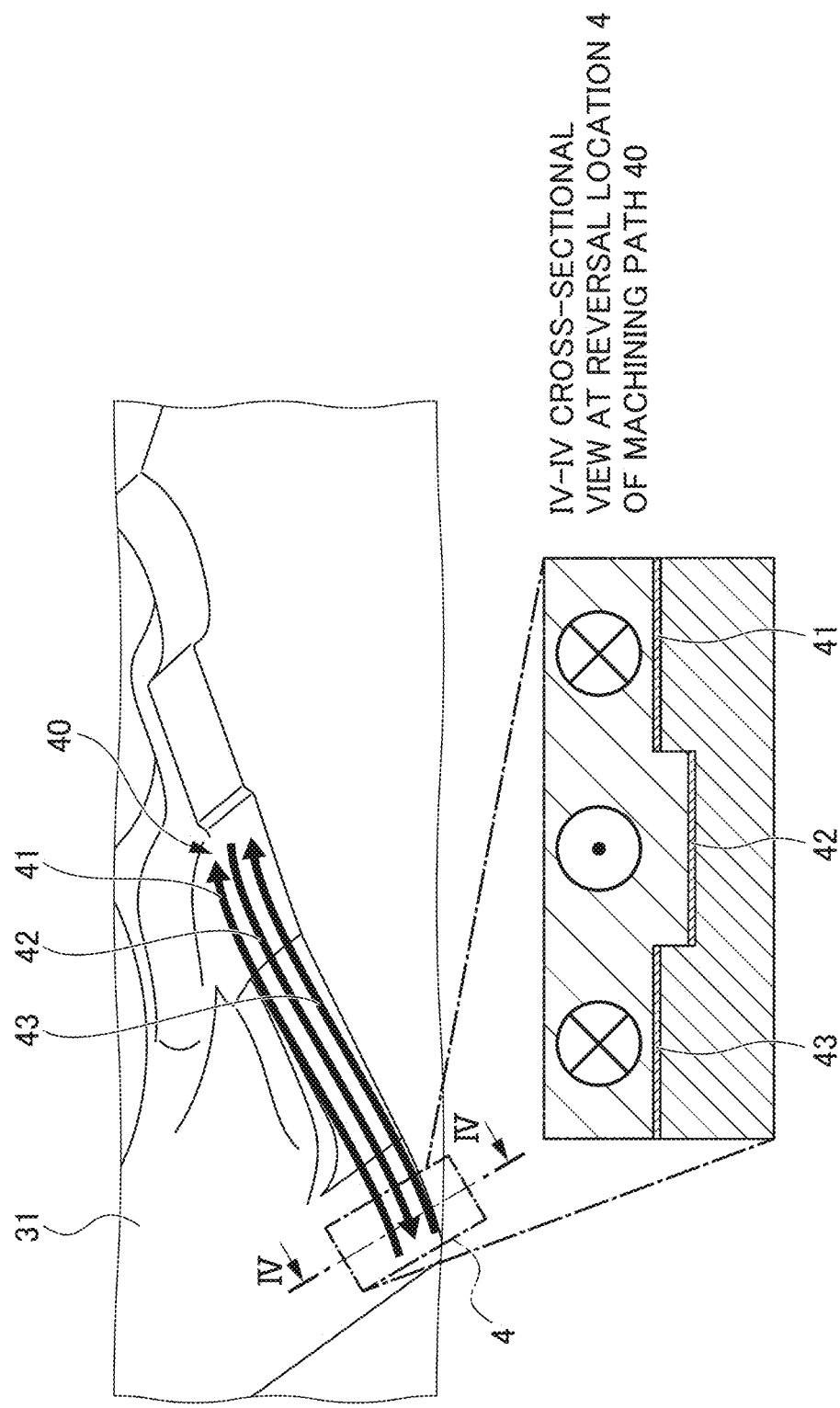
FIG. 2 is a diagram for describing a step at a reversal location of a machining path.

Referring to FIG. 2, the step caused by the reversal of the machining path will be described. In FIG. 2, a surface of an object to be machined (workpiece) 31 is machined in the order of a first path 41, a second path 42, and a third path 43 of a machining path 40. A leftmost frame of such a machining path indicates a vicinity of a reversal location of the machining tool, that is, a vicinity of a reversal location of the machining path. In an IV-IV cross section at the location, there is a height difference between the machining paths, that is, a step, as shown in an enlarged view below.

Figure 3:
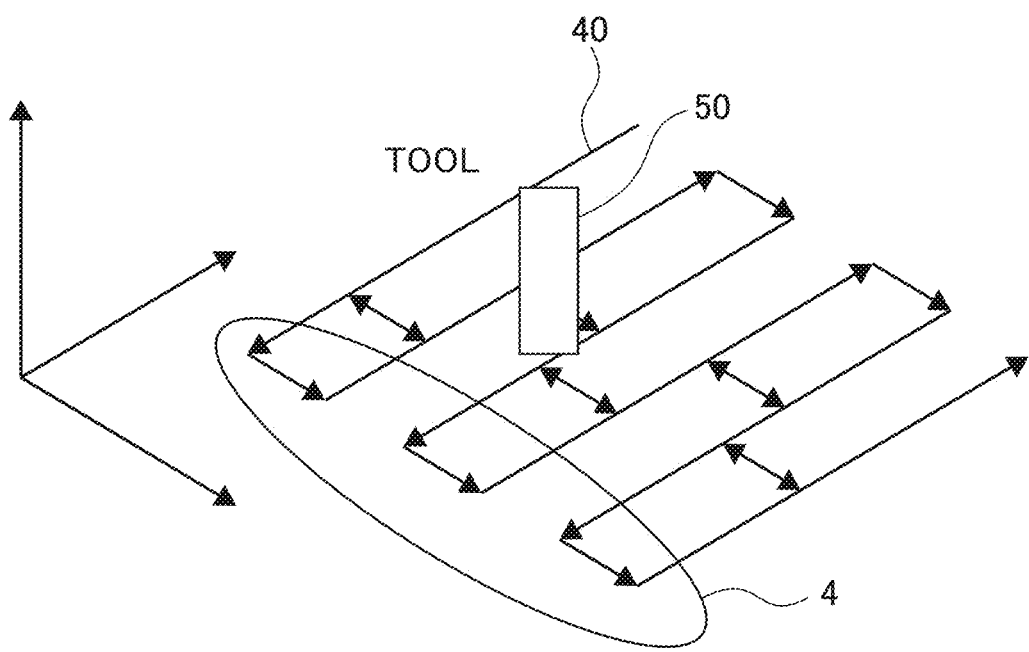
FIG. 3 is a first diagram showing a procedure of step determination.

Next, a description will be given with reference to FIGS. 3 to 7 with respect to a method of determining whether a step occurs at the reversal location of the machining path according to the present disclosure. First, as shown in FIG. 3, a position is detected where a traveling direction of a machining tool 50 is reversed on the machining path 40. In FIG. 3, a location surrounded by an ellipse is a reversal location 4. Note that a method of detecting the reversal location 4 of the machining path 40 is known (for example, Patent Document 1).

Figure 4:
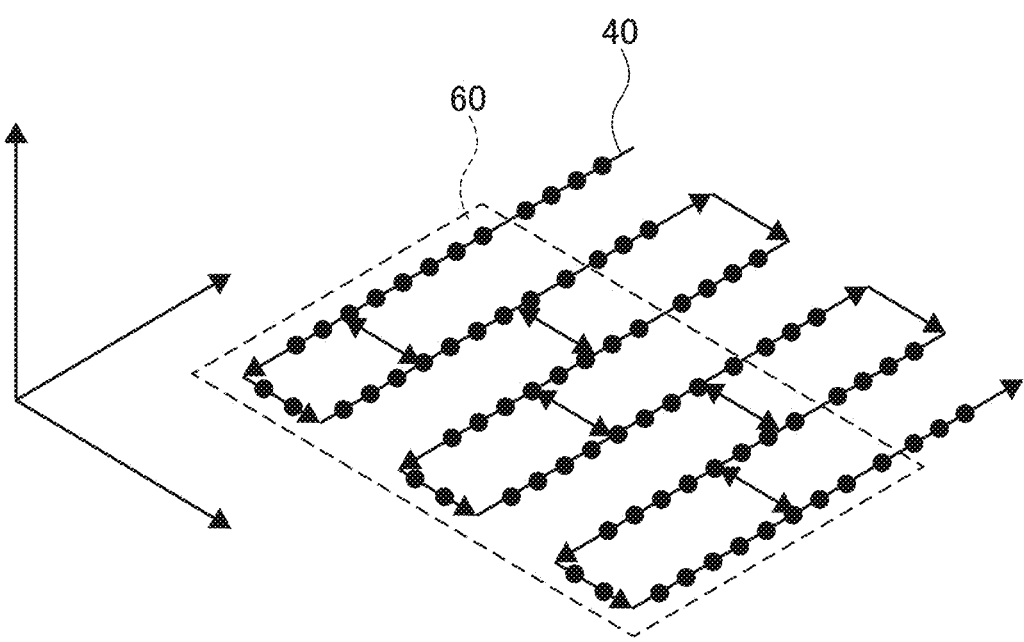
FIG. 4 is a second diagram showing a procedure of step determination.
Figure 5:
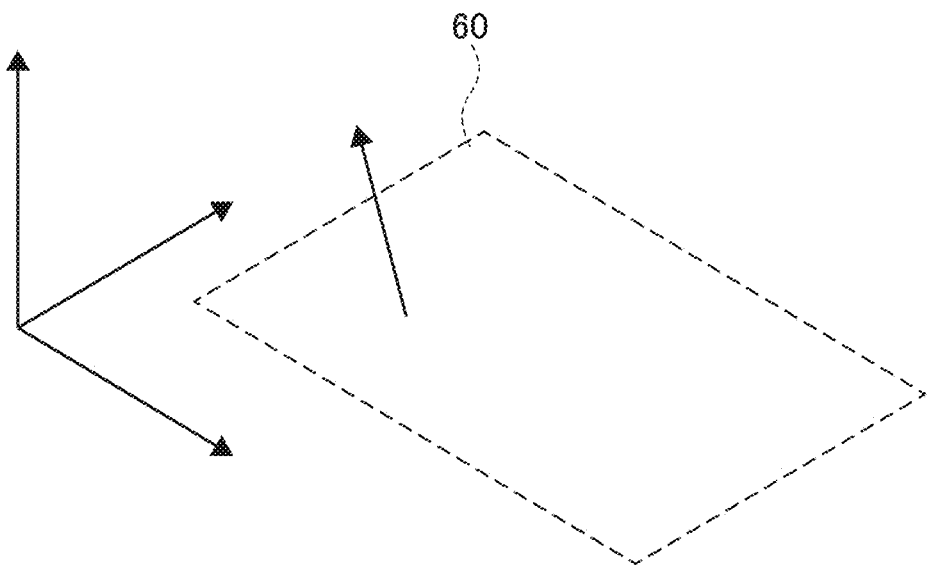
FIG. 5 is a third diagram showing a procedure of step determination.

Next, as shown in FIG. 4, measurement points are selected on the machining path 40 before and after the detected reversal location 4. Then, an equation for an average plane is derived from the measurement points. Such a plane is a reference plane 60. The measurement points are sufficiently selected according to a length of the detected reversal location 4 and a width and inclination of the machining path so as to determine an average plane. Then, as shown in FIG. 5, a direction perpendicular to the reference plane 60 is defined as a height direction.

Figure 6:
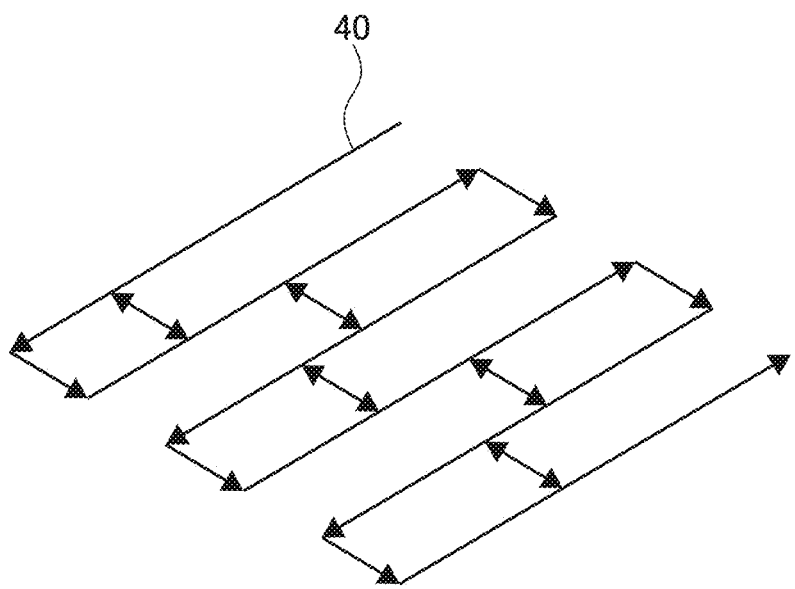
FIG. 6 is a fourth diagram showing a procedure of step determination.
Figure 7:
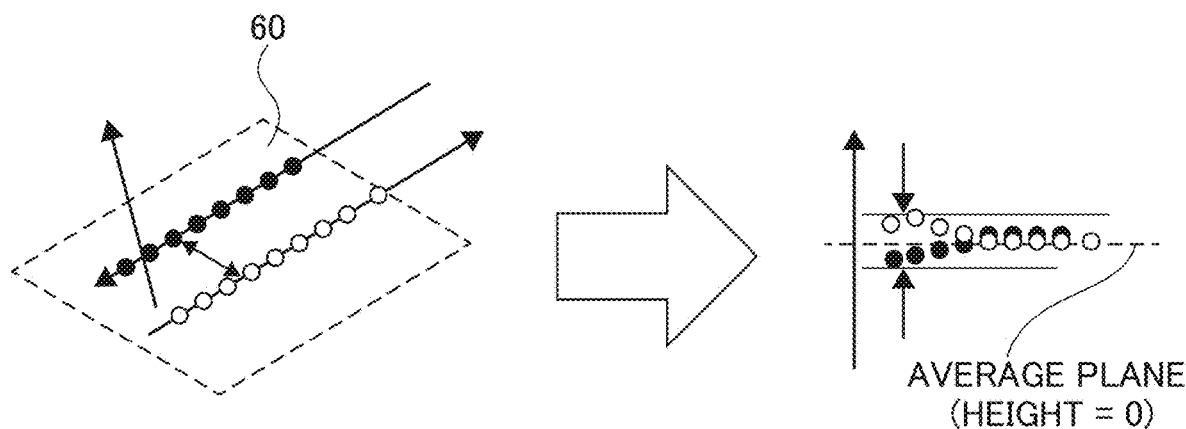
FIG. 7 is a fifth diagram showing a procedure of step determination.

Next, as indicated by arrows in FIG. 6, adjacent paths on the machining path 40 are specified. Then, as shown in FIG. 7, a height of each of the measurement points relative to the reference plane 60 is calculated, and is compared with a height of the adjacent path. When the maximum value of these differences in height is equal to or greater than a set threshold value, it is determined that a step has occurred.

As a method of determining a step from a height difference, as described above, a step can be determined based on distances between the measurement points (machining points) and the reference plane 60 on the adjacent machining paths 40, but a step can be determined from absolute values of inner products of vectors of the adjacent machining paths 40. This is because it can be said that the greater the height difference at the reversal location 4 of the adjacent machining paths 40, the more both slopes are different.

Figure 8:
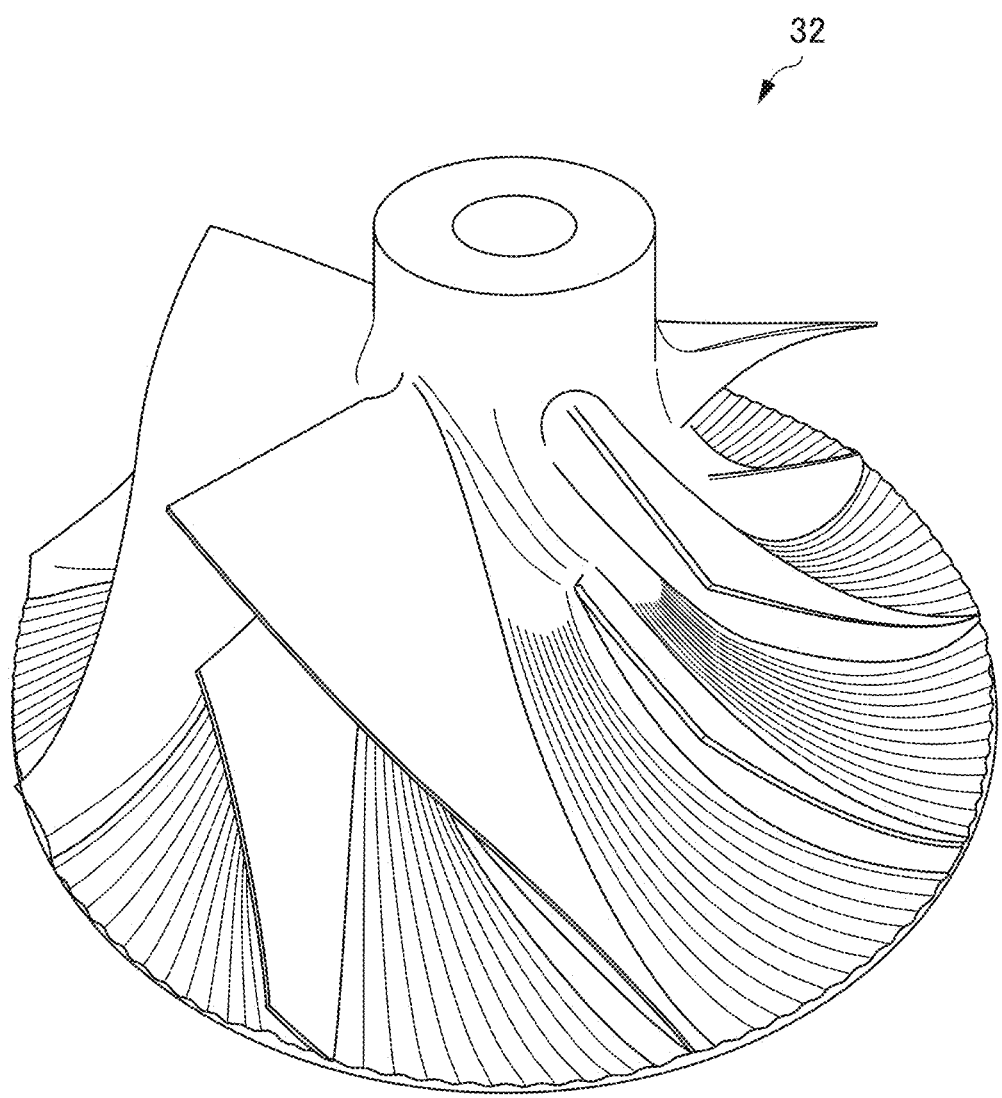
FIG. 8 is a diagram showing an example of an object (workpiece) to be machined by a machine tool.
Figure 9:
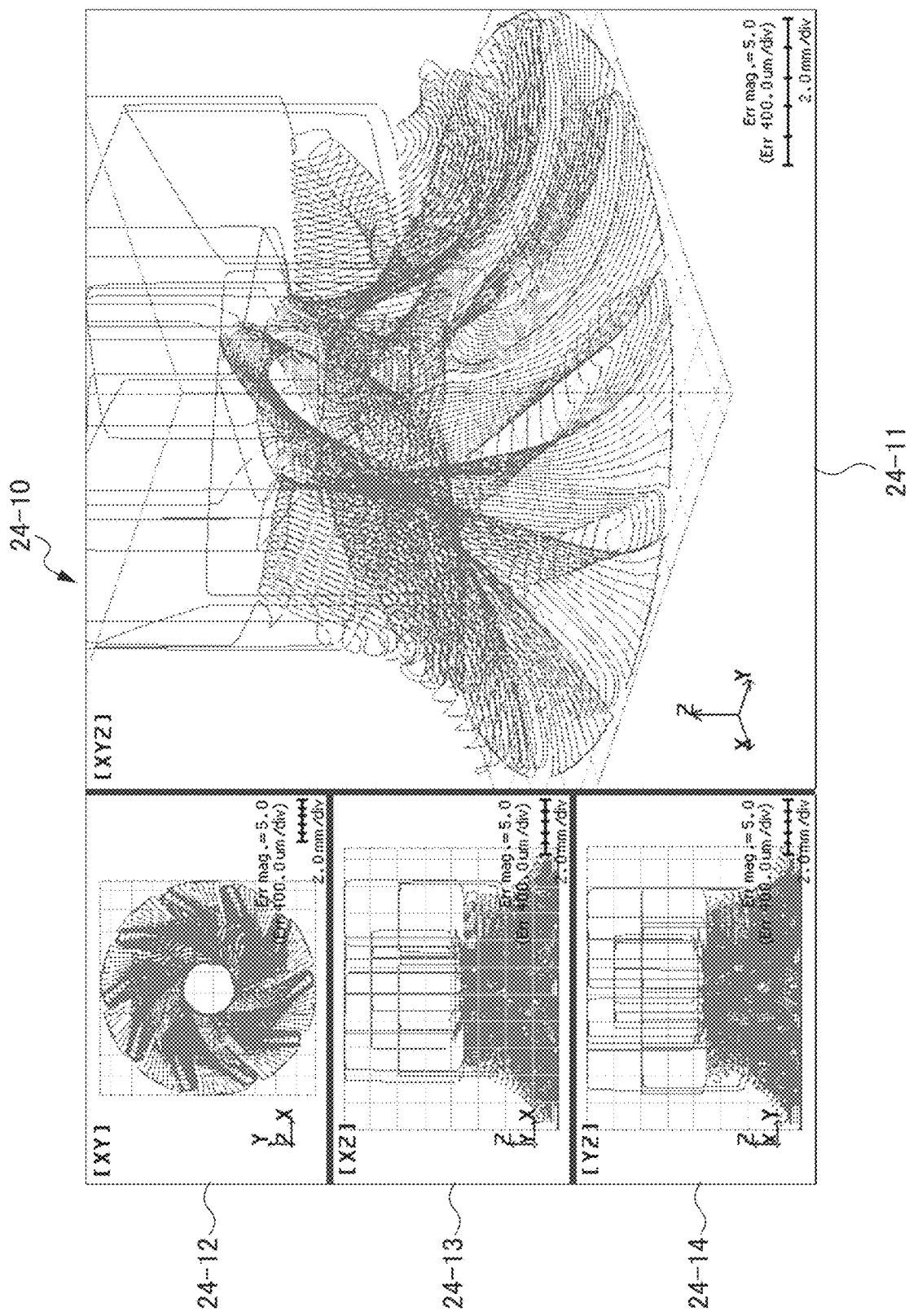
FIG. 9 is a diagram showing an example in which an object to be machined is displayed by the display device.

Next, specific display examples on the display unit 24 of the display device 20 according to the present disclosure will be described with reference to FIGS. 8 to 10. FIG. 8 shows an example of an object to be machined 32 by the machine tool of the present disclosure, and FIG. 9 shows a state in which a machining path of a tool for the object to be machined 32 is displayed on a display screen 24-10 of the display unit 24 in the display device 20. The object to be machined 32 shown in FIG. 8 is an impeller (runner) used in a pump or the like, and has a considerably complicated surface shape, and it can be seen that the machining tool tracks a complicated path as shown in FIG. 9.

The display screen 24-10 shown in FIG. 9 includes a large screen on a right side and a small screen divided into three parts in an up-down direction on a left side. The large screen on the right side is a stereoscopic three-dimensional screen 24-11 that stereoscopically displays a machining path of the object to be machined 32. Since only a machining path on a surface of the object to be machined 32 is extracted and displayed, a machining path on a rear side of the object to be machined 32 can also be seen, which is hidden in the real object, and the machining path is displayed in a three-dimensional space as a whole.

The small screen on the left side divided into three parts in the up-down direction is provided with a two-dimensional screen in XY plan view 24-12, a two-dimensional screen in XZ plan view 24-13, and a two-dimensional screen in YZ plan view 24-14. Grids are arranged on a front side of the two-dimensional screen in XZ plan view 24-13 so as to grasp a length of a target on the surface.

Figure 10:
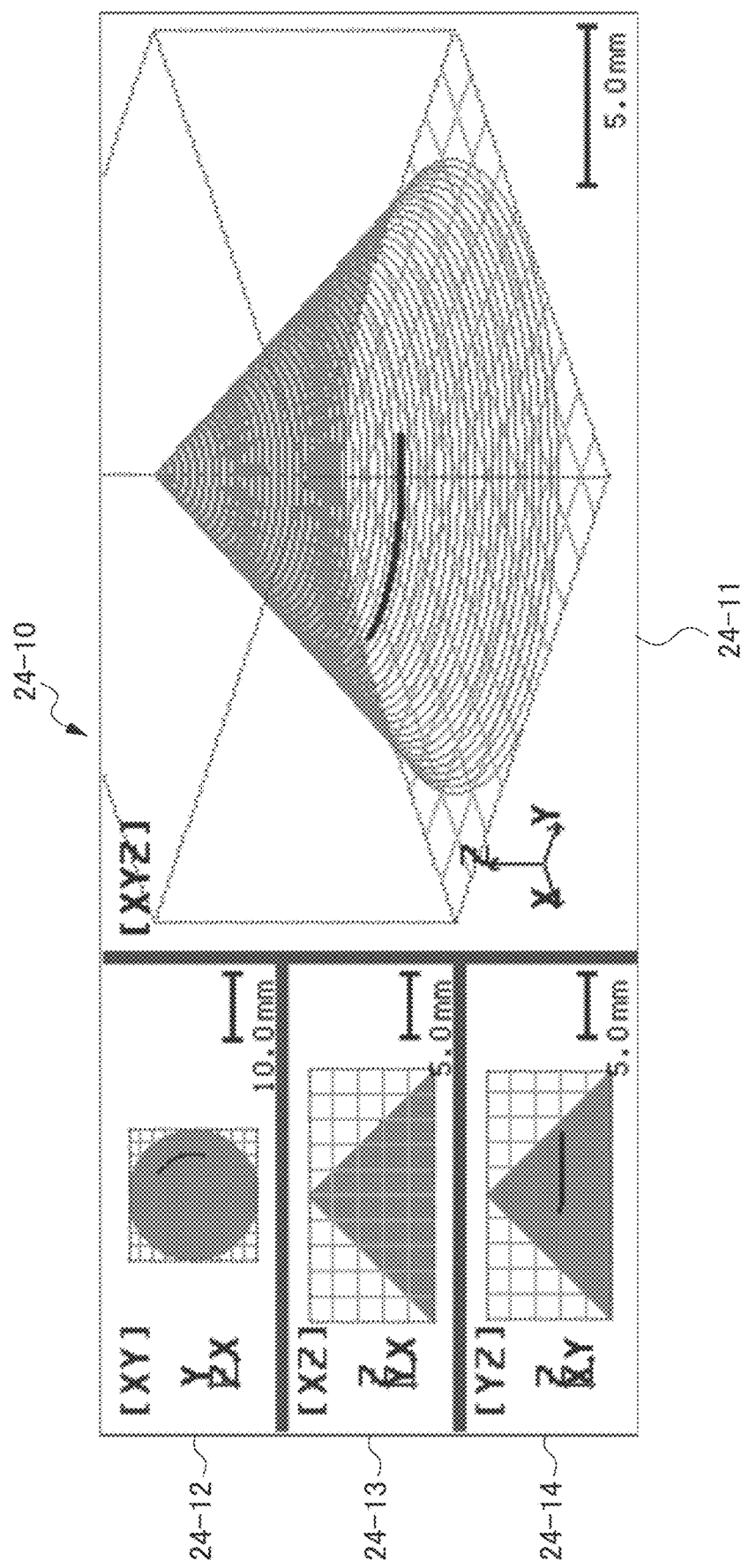
FIG. 10 is a diagram showing an example in which a step location is displayed in another object to be machined.

FIG. 10 shows an example in which the display screen 24-10 displays a problematic target location (for example, a location where a step occurs in the machining path). In the display example of FIG. 10, for the sake of clarity, a workpiece having a simple shape (conical shape) is displayed as the object to be machined 32. As shown in FIG. 10, it can be seen in the display screen 24-10 that the problematic target location is represented by a curved line on the stereoscopic three-dimensional screen on the right side, and is also displayed at a corresponding location on the two-dimensional screen in XY plan view 24-12 and the two-dimensional screen in YZ plan view 24-14. From such a display, a user can quickly and accurately grasp the problematic target location.

Next, a display method will be described with reference to FIG. 11 in which the display device of the present disclosure displays a step which occurs at the reversal location of the machining path. As shown in FIG. 11, first, the display device acquires, from a servo control device of a machine tool or an industrial machine, time-series data of a position of a driven axis or an electric motor on each axis of the machine tool or the industrial machine (Step St1), and calculates a machining path of a tool from the acquired time-series data of the position of the driven axis or the electric motor on each axis of the machine tool or the industrial machine (Step St2).

Next, from the machining path obtained by calculation, reversal locations of the machining path is detected by a known method (Step St3), and a reference plane is set at one reversal location of the detected reversal locations (Step St4). As described above, in a case of detecting and displaying steps in the machining path using the reversal locations of the machining path as a target, measurement points (machining points) on the machining path are selected before and after the reversal locations of the machining path, an average plane is obtained from these machining points, and the location is defined as a reference plane.

Next, adjacent machining paths at the reversal locations to be targeted are selected, and heights of the adjacent machining paths are compared with each other (Step St5). Specifically, from the reference plane set in Step St4, a difference between heights of adjacent machining paths is calculated using a direction perpendicular to the reference plane as a height direction. As a method of calculating (determining) the height difference, there is a method of obtaining from the maximum value of the distance from the machining points on the adjacent machining paths to the reference plane, as described above.

Next, the height difference obtained in Step St5 is compared with a set threshold value, and it is determined whether the height difference is equal to or greater than the threshold value (Step St6). The threshold value is set according to accuracy in smoothness of the machining surface required by the object to be machined. When it is determined in Step St6 to be YES, that is, when the height difference is equal to or greater than the threshold value, the process proceeds to Step St7, and when it is determined in Step St6 to be NO, that is, the height difference is smaller than the threshold value, the process proceeds to Step St8.

In Step St7, when it is determined in Step St6 that the height difference at the reversal locations of the adjacent machining paths is equal to or greater than the threshold value, it is determined that the step has occurred, and the reversal locations of the adjacent machining paths are highlighted on the stereoscopic three-dimensional screen of the display device. In the embodiment of the present disclosure, as described above, the reversal locations of the adjacent machining paths are also displayed on the corresponding two-dimensional screen in XY plan view, on the two-dimensional screen in XZ plan view, and on the two-dimensional screen in YZ plan view.

Subsequent to Step St7, the process proceeds to Step St8, and it is determined whether comparison of height differences between all adjacent machining paths has been completed at the reversal location of one machining path to be targeted. When it is determined in Step St8 to be YES, that is, when the comparison of height differences between all adjacent machining paths has been completed at the reversal location of one machining path to be targeted, the process proceeds to Step St9, and when it is determined in Step St8 to be NO, that is, when the comparison of height differences between all adjacent machining paths has not been completed at the reversal location of one machining path to be targeted, the process returns to Step St5, and thereafter, the loop from Step St5 to Step St8 is repeated until it is determined in Step St8 to be YES.

In Step St9, it is evaluated whether a step has occurred at all the detected reversal locations of the machining path, and when a step has occurred, it is reflected whether the entire process of highlighting has been completed. When it is determined in Step St9 to be YES, that is, it is evaluated whether a step has occurred at all the detected reversal locations of the machining path, and when a step has occurred and the entire process of highlighting has been completed, the purpose of the present disclosure is achieved and the flow ends. When it is determined in Step St9 to be NO, that is, it is evaluated whether a step has not occurred at all the detected reversal locations of the machining path, and when a step has occurred and the entire process of highlighting has not been completed, the process returns to Step St4, and thereafter, the loop from Step St4 to Step St9 is repeated until it is determined in Step St9 to be YES.

So far, the case has been described through the embodiment in which the step in the machining path occurs at the reversal location of the machining path. This is because recognition of the occurrence of the step is very important, from the fact that it is known that a step tend to occur at the reversal location of the machining path and the step occurring at the reversal location of the machining path affects the machining accuracy such as surface smoothness of the object to be machined.

However, as described above, examples of main factors that cause steps in the machining path include a case where the command path created from the machining program has a step and a case where a step constantly occurs, in addition a case where a step occurs at the reversal location of the machining path. In some cases, a step occurs on a program out of necessity, and there is a case in which it is necessary to exactly know a position where the step occurs.

A method of evaluating and displaying the step that occurs when the command path created from the machining program has a step is the same as the method of evaluating and displaying the step that occurs when the machining path is reversed. In this case, the reference plane is set by specifying an approximate position from the machining program and then obtaining an average plane from measurement points (machining points) nearby.

According to the display device of the present disclosure, it is possible to display the occurrence location in the machining path of the step that affects machining accuracy and to accurately foresee the occurrence of the step in the machining path at low costs. In addition, quantitative evaluation becomes possible, and in particular, improvement in efficiency of an evaluation process at the time of start-up of the machine is expected.

Further, it can also be said that the invention of the present disclosure is applicable not only to a case where a step occurs at the reversal location of the machining path but also to a case where the command path created from the machining program has a step, and to a case where a step constantly occurs, and thus has a wide range of applications.

Although the embodiment of the present invention has been described above, the present invention is not limited to such an embodiment, and can be naturally implemented in various ways without departing from the gist of the present invention.

EXPLANATION OF REFERENCE NUMERALS

10 servo control device
11 control unit (CPU)
12 storage unit
13 transmitting/receiving unit
20 display device
21 data acquisition unit (transmitting/receiving unit)
22 storage unit
23 data processing unit
231 path calculation unit
232 path comparison unit
24 display unit
24-10 display screen
24-11 stereoscopic three-dimensional screen
24-12 two-dimensional screen in XY plan view
24-13 two-dimensional screen in XZ plan view
24-14 two-dimensional screen in YZ plan view
31 object to be machined
32 object to be machined (impeller)
4 reversal location of machining path
40 machining path
41 first path of machining path
42 second path of machining path
43 third path of machining path
50 tool
60 reference plane

The invention claimed is:

1. A display device of a machining path for a servo control device configured to control an electric motor that drives axes of a machine tool or an industrial machine, the display device comprising:
   a data acquisition unit that acquires time-series data of a position of a driven body or an electric motor on each axis of the machine tool or the industrial machine;
   a path calculation unit that calculates a machining path from the time-series data of the position of the driven body or the electric motor on each of the axes which is acquired by the data acquisition unit;
   a path comparison unit that, from a result calculated by the path calculation unit, sets a reference plane for a height of the machining path and compares heights of adjacent machining paths from the reference plane; and
   a display unit that displays a location where a height difference equal to or greater than a set threshold value occurs on the adjacent machining paths.

2. The display device according to claim 1, wherein the display unit highlights, on a three-dimensional display, the location where the height difference equal to or greater than the set threshold value occurs on the adjacent machining paths.

3. The display device according to claim 1- or 2, wherein the path comparison unit determines the height difference equal to or greater than the threshold value by a distance between machining points on the adjacent machining paths and the reference plane.

4. The display device according to claim 1, wherein the location, which is displayed by the display unit, where the height difference equal to or greater than the set threshold value occurs on the adjacent machining paths is a location where a step occurs due to a reversal of the machining path.

5. The display device according to claim 1, wherein the location, which is displayed by the display unit, where the height difference equal to or greater than the set threshold value occurs on the adjacent machining paths is a location where a step occurs due to a machining program.

* * * * *